J. R. GAMMETER.
MACHINE FOR MAKING TIRES.
APPLICATION FILED FEB. 7, 1914.
1,285,976.
Patented Nov. 26, 1918.
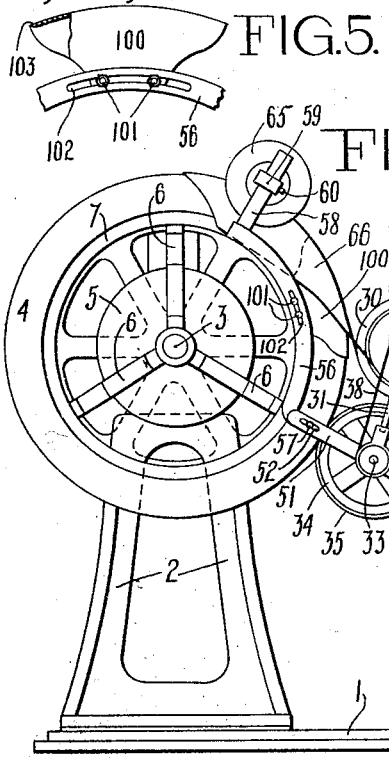
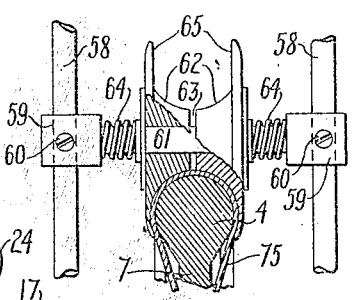
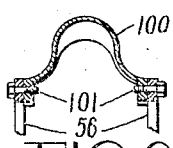
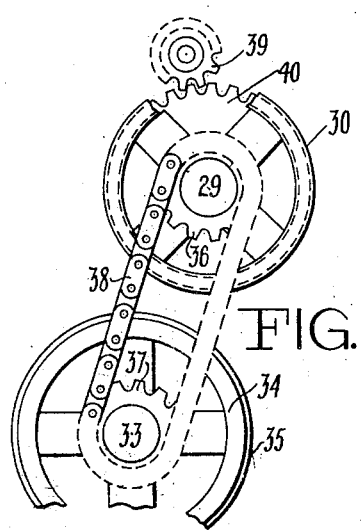
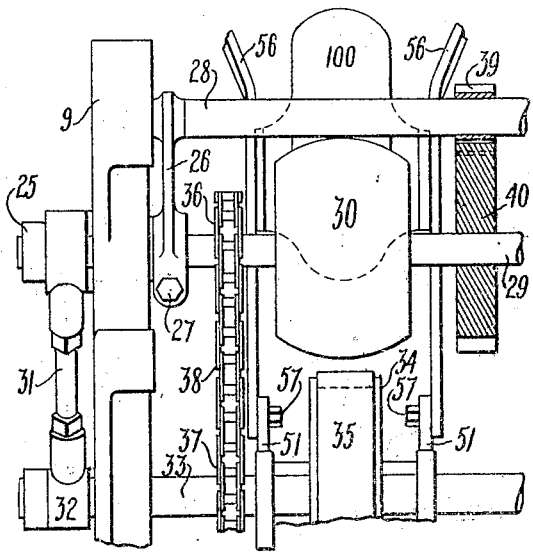

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

MACHINE FOR MAKING TIRES.

1,285,976. Specification of Letters Patent. Patented Nov. 26, 1918.

Original application filed December 2, 1909, Serial No. 531,045. Divided and this application filed February 7, 1914. Serial No. 817,218.

*To all whom it may concern:*

Be it known that I, JOHN R. GAMMETER, a citizen of the United States, residing at Akron, county of Summit, and State of Ohio, have invented certain new and useful Improvements in Machines for Making Tires, of which the following is a specification.

My invention relates to the making of tires composed of fabric and rubber, and more particularly to the making of the outer casings or shoes of pneumatic tires. Tires of this nature, designed for use on heavy motor vehicles, commonly comprise a main body portion composed of a number of layers of fabric laid one upon another and held together with a suitable binder, usually of rubber gum with which the fabric is impregnated, beads secured to the inner edges of the body portion for securing the tire to the rim, and an outer tread surface of soft rubber. This application, which is a division of my application Serial Number 531,045, filed December 2, 1909, relates particularly to means whereby the fabric used in forming the tire is stretched and shaped prior to its actual incorporation in the tire and also at the moment when it is applied to the core upon which the tire is being built.

In the accompanying drawings which form a part of this specification, Figure 1 is a side elevation of a tire-making machine embodying my invention; Fig. 2 is a fragmentary side elevation showing the fabric feeding rolls and driving mechanism therefor; Fig. 3 is a detail view partly in section showing the construction of a supporting and guiding roll and its associated parts; Fig. 4 is an end view of the driving mechanism shown in Fig. 2; Fig. 5 is an enlarged side elevation partly in section of a shoe for guiding the fabric as it is applied to the core; Fig. 6 is a transverse sectional view of the shoe.

Referring to the drawings in detail the numeral 1 designates a bed plate upon which is mounted a pair of uprights 2 carrying the main shaft 3, the forward end of which projects in front of the uprights. Upon the overhanging end of this shaft I provide means for supporting the core or ring 4 about which the tire is to be formed. The means employed for this purpose preferably comprises a chuck 5 having three outwardly projecting arms 6 with salient V-shaped extremities adapted to engage within a V-shaped groove cut in the inner face of the inwardly projecting flange 7 of the core. The chuck may be of any usual or well known construction and may resemble the chucks commonly used for holding work upon turning lathes, in which, by the use of a suitable key or wrench engaging a nut, appropriate mechanism within the chuck may be operated to expand or retract simultaneously all of the arms 6. By this means the proper centering of the core or ring 4 is insured.

For driving the shaft 3 and rotating the chuck and ring carried thereby, any suitable mechanism may be employed.

Fixed upon one end of the bed plate is a base 8 upon which is mounted an upright 9 provided with bearing recesses 10 and 11. The upright is preferably mounted to slide on the base toward or away from the tire-carrying ring 4. A screw 12 operated by hand wheel 13 and working in a nut 14 carried by the upright provides means for adjusting the position of the latter.

In the bearing 10 is mounted the shaft 15 of a reel 16 carrying a roll 17 of the fabric from which the body of the tire is to be formed, the gummed tire-forming fabric being laid upon and rolled up with a strip of ungummed fabric or "liner," which prevents the layers of gummed fabric from adhering to each other. To prevent the too ready rotation of this reel, the shaft 15 is preferably provided with a brake disk 18 against which bears a brake shoe 19 mounted at one end of an arm 20 pivoted on a pin 21. On the other end of the arm 20 slides a weight 22 which may be secured in any desired position by a set screw 23 to produce the proper braking effect. In the upper bearing recess 11, which is preferably of considerable depth, is mounted a reel 24 which is driven through friction from the roll 17 and upon which is wound the ungummed strip or liner coming from the roll. As the roll 17 is unwound, the liner being taken up by the reel 24 will increase the diameter of the latter, the deep bearing recesses 11 permitting the shaft of the reel to rise correspondingly.

Also mounted on the upright 9 is a pair of longitudinally alined sleeves 25, one being carried by each of the side members of the upright and each projecting at each side of its side member to form a pair of cylindrical bosses. To the two bosses thus formed projecting from the inner sides of the side members of the upright 9 is secured a pair of upwardly extending arms 26. These arms are secured to the bosses against rotation in any suitable manner, as by having their lower ends split and drawn together by clamping bolts 27. Rotatably mounted in these arms is a roller 28, and journaled in the sleeves 25 is a shaft 29, to which is fixed a convex or bellied roller 30, which however may have any other suitable contour as the shaping of the tire is due primarily to certain features of construction hereinafter explained. On the bosses formed by the outwardly projecting portions of the sleeves 25 is pivoted a pair of depending arms 31, secured to the lower ends of which are boxes 32 carrying a shaft 33. To this shaft 33 is fixed a driving wheel 34 preferably provided with a rubber tire 35, or other suitable friction surface adapted to bear against the core or ring 4 or the fabric wound thereon and to receive motion from the latter. Means are also provided for driving the shaft 29 and the roller 30 from the shaft 33, these means being shown in this case as a pair of sprocket wheels 36 and 37 connected by a chain 38. Gears 39 and 40 are also preferably provided for driving the roller 28 from the shaft 29. It is obvious that any other form of driving connections may be used in place of those described. For holding the wheel 34 in driving contact with the ring 4, or partially formed tire, I provide a frame 41 pivoted at one end to the shaft 33 and having projecting from the other end thereof a shaft 42, the free end of which slides in a box 43 pivoted between the arms of a forked lever 44 fixed to a shaft 45 journaled in the upright 9. To the projecting end of this shaft is secured a hand lever 46 having a pawl 47 engaging with a fixed notched segment 48. A spring 49 is pressed between the box 43 and the hub of a hand wheel 50 screwing on a threaded portion of the shaft 45 and forces the frame and the driving wheel carried thereby forward, the tension of the spring being regulated by the position of the lever 46. The tension of the spring may also be adjusted by rotating the hand wheel 50.

Also supported on the shaft 33 is a pair of arms 51 having slots 52 in their outer ends. The rear ends of said arms are bent upwardly as shown at 53 and provided with slots 54 arranged concentrically with the shaft 33. By means of bolts 55 passing through the slots 54 the arms may be secured to the frame 41 in desired angular position. Secured to these arms 51 is a pair of segmental bars 56. These bars are preferably secured to the arms by means of bolts 57 passing through the slots 52, whereby the position of the bars relatively to the arms may be adjusted. From the upper end of each of the bars 56 projects a radial standard 58, upon each of which is mounted a box 59. The boxes are slidably mounted on these radially disposed standards, means such as set screws 60 being provided for securing them in desired position thereon. In the boxes 58 is journaled a transverse shaft 61 upon which is mounted a roller 62 adapted to bear upon the ring 4, or partially formed tire, and to support the free end of the bars 56. This roller 62 is preferably split as at 63, its two halves being urged together by springs 64. It is preferably formed of some yielding material such as soft rubber, in order that it may fit smoothly on the layers of fabric wound upon the core 4, and its extended flanges 65 closely embrace the sides of the partly formed tire.

Also supported by the bars 56 is the fabric-shaping guide, spreader or shoe 100. This is preferably secured to the bars by means of bolts 101 passing through slots 102 therein, whereby a limited circumferential adjustment of the guide is permitted. The guide preferably consists of a single piece of metal shaped to conform closely to the outer surface of the core and tapered to a comparatively thin edge 103 at its upper end, which is brought as close as possible to the surface of the core or partially formed tire thereon. The outer surface of the guide is made smooth to permit the fabric to slide thereover. The fabric coming from the reel 16 and passing under the reel 24, which takes up the liner, passes over roll 28 and around 30, slides over this guide 100, and is cupped to the approximate shape of the tire section, being laid on the core by the roll 62. The fabric is, of course, treated in the usual manner, with a suitable rubber compound, and, being in a sticky condition, adheres closely to the core. I provide any suitable means for forming the fabric to the undercut portion of the core and completing the manufacture of the tire. These means constitute no part of the invention claimed in the present application and therefore are not shown or described.

In the operation of my device a core or ring is inserted in the machine and secured to the chuck. As the arms of the latter always move equally toward and away from the center of rotation of the chuck, the centering of the ring is assured. The split roller now rests on the outer surface of the ring or core and supports the outer ends of the bars 56 and the guide or shoe 100 in proper position relatively thereto, the forward edge of the guide lying in close proximity to the outer surface of the ring. The driving wheel 34 is held in driving engagement with the ring by the pressure of the spring 49, the tension of which is regulated by the hand lever 46. A reel 16 bearing a roll of fabric 17 is now placed in the bearing recesses. This roll of fabric preferably comprises a series of strips of gummed bias fabric 75, each of a length just sufficient to make one tire, the strips being joined by leaders, not shown, which are preferably also formed of bias fabric of texture similar to the fabric used for forming the tires and are impregnated with rubber and vulcanized. The band of strips of gummed fabric and leaders thus formed is rolled up with a strip of ungummed fabric or liner, as already described. A leader is secured to the free end of the first strip of gummed fabric. In starting the tire this leader is carried over the roller 28 and around the convex or bellied roller 30 and over the shoe 100, the end of it being applied to the ring or core 4, to which it is secured by a suitable cement or otherwise. The end of the liner is rolled about the reel 16. After the application of any desired tools, not shown, to cause the fabric to adhere smoothly to the core, power is applied to the main shaft. The driving wheel 34 will now begin to rotate, and will, through the chain 38 and gearing 39 and 40, positively drive the rolls 28 and 30. The diameters of the driving wheel 34 and the roll 30, and of the sprockets 36 and 37, are so proportioned that the peripheral speed of the central portion or crown of the roll 30 is somewhat less than that of the outside of the core or ring, usually about 15 per cent. less. The peripheral speed of the roll 28 is, however, preferably about equal to that of the crown of the roll 30, although I may make it slightly less if desired. The roll 28 is usually provided with a roughened surface, as by covering it with cloth or rubber, in order to prevent slipping between its surface and the fabric passing over it, whereby it will be caused to feed the fabric uniformly to the roll 30. Between the roll 30 and the core the fabric will be stretched, owing to the smaller peripheral speed of the former. The stretching will be greatest in the middle of the strip of the fabric as the peripheral speed of the inner portions of the core to which the edges of the fabric are to be applied is less than that of the outer circumference of the core and usually no greater than that of the roller 30. The leader 66 is used in order to equalize the stretch in the strip of tire forming fabric and to produce the same condition in it at the starting and completing of the tire as exists during the remainder of the formation thereof. After the core has been rotated to such an extent that the end of gummed fabric has been drawn into contact therewith by the leader and has become firmly attached thereto, the leader, which is of such a length as to extend only a part of the way around the core, is removed. The rotation of the core is then continued, and the winding up and laying of the gummed tire forming fabric is begun.

As the result of the difference between the rate at which the fabric is fed over the rolls 28 and 30 and the rate at which it is taken up by the rotation of the core, the fabric must stretch between the roll 30 and the core. During this stretching operation the fabric is dragged over the guide or shoe 100, which gives a much more pronounced stretch to the middle portions of the fabric strip than to the edges of the latter, thus causing the fabric naturally to assume a cupped shape, which it must occupy when a part of the tire. By properly designing the outline of the guide 100 and the shape of its forward edge 103 over which the fabric slides to the tire, the relative stretch of the different parts of the fabric can be determined to a nicety. The circumferential adjustment of the guide in the slides 102 also affects the relative stretch of the different parts of the fabric, the stretch in the middle of the fabric being greatest when the guide is in its most advanced position. This guide or shoe 100 has the very important function of supporting the strip of fabric out of contact with the core or partially formed tire thereon, while the stretching operation is taking place, thus permitting the different parts of the fabric to adjust themselves under the varying tensions to which they are subjected and to assume the cupped shape which the fabric is to occupy when incorporated in the tire before the fabric slides upon the core or partially formed tire and adheres thereto. If the fabric were permitted to pass directly from the roll 30 to the rotating core it would become attached to the latter or to the partially formed tire thereon before it had an opportunity to be completely stretched or to assume its final configuration, the result being that when rolled down upon the sides of the core it would not lie flat, but would tend to wrinkle and would be subject to uneven tensions in the completed tire. This feature of my invention I regard as of great value, although in certain cases, particularly in making tires of small sizes, it may be dispensed with.

The fabric is now so formed that it will lie closely to the outer portions of the ring, and as the latter continues to revolve the fabric will pass under the split roll 62 which moves it down over the top half of the ring section.

As will be seen, the roller 62 will be lifted slightly by the successive layers of fabric, carrying with it the bars 56, and the guide 100, which will thus always just clear the layers of fabric immediately beneath it. It will also be seen that as the rollers 28 and 30 are driven from the driving wheel 34, which takes its motion from the outer surface of the tire so far as built up, the ratio of the peripheral speed of the outer surface of the partially formed tire to that of the roller 30 will remain constant regardless of the increasing diameter of the former. If this were not the case the peripheral speed of the tire as the additional layers were put on and its diameter increased, would correspondingly increase, and supposing the peripheral speed of the roller 30 to remain constant, the successive layers of fabric would be subject to a gradually increasing stretch. The result would be the production of a tire the outer layers of which were under greater tension than the inner. I therefore prefer to use a form of gearing between the core and feeding or stretcher roll, including a wheel substantially as described running in frictional contact with the core or fabric layers thereon, but I do not wish to be wholly limited to this form of gearing or interconnection between the fabric feeding and tire-forming elements, inasmuch as I believe myself to be the first to provide any form of mechanism for imparting a predetermined degree of stretch to the fabric passing onto the core. The friction brakes heretofore proposed for this purpose do not operate uniformly with varying conditions, and the results are far inferior to those afforded by the present invention, especially when a number of successive layers are applied in one continuous operation.

The operation of forming the tire by any suitable tools is continued until a sufficient number of layers of fabric have been applied to form the completed body portion of the tire, whereupon the band of fabric coming from the roll is severed.

While I have illustrated and described only one specific embodiment of my invention, I realize that it is susceptible of wide application and I do not desire to be limited to the precise structure shown and described.

Having thus described my invention, I claim:

1. In a machine for making tire casings, the combination of a rotatable core, a stretcher drum, means for turning said core and drum at different surface speeds, and a pivoted arched former carrying a roller which rests upon the core as the latter is being turned.

2. In a machine of the character described, the combination of a revoluble core, a retarding means, and a fabric spreader, the forward end of which extends over said core, said spreader being shaped to prevent the formation of wrinkles in the fabric ply as it is applied to the core, substantially as described.

3. In a tire making machine, a rotatable core, a shaping and guiding shoe for guiding the fabric to said core, said shoe being movable into and out of operative position, and adapted to be supported on said core or the partially formed tire thereon when in operation.

4. In a tire making machine, a tire forming device, and means for feeding fabric thereto, said means being interconnected with the forming device and adapted to deliver the fabric at a less speed than it is taken up by said device.

5. In a tire making machine, a tire-forming core, means for rotating the same, and a feed roll from which the fabric is fed to the core, said feed roll being interconnected with the core and having a peripheral speed less than that of the core.

6. In a tire-making machine, the combination of a rotatable tire-forming core of rounded cross-section, a rotary fabric-feeding roll, and gearing interposed between said core and roll and causing the latter to rotate at a lower peripheral speed than that of the core, so as to impart a predetermined amount of stretch to the middle of the fabric as it passes onto the core.

7. In a tire making machine, a core, means for rotating the same, a feed roll, and means independent of the fabric passing to the core for driving the feed roll, said means comprising a driving wheel held in frictional engagement with said core or the partially formed tire thereon, and driven through such engagement, and gearing between said driving wheel and said roll.

8. In a tire-making machine, a core, means for rotating the same, a feed roll, and means independent of the fabric passing to the core for driving the feed roll, said means comprising a driving wheel driven by said core-rotating means and driving connections between said driving wheel and said roll.

9. In a tire making machine, a core, means for rotating the same, a plurality of feed rolls over which the fabric passes in succession, and means independent of the fabric passing to the core for driving said rolls comprising a driving wheel held in frictional engagement with said core or the partially formed tire thereon, and driven through such engagement, and gearing between said driving wheel and said rolls.

10. In a tire making machine, a core, means for rotating the same, a feed roll over which the fabric is adapted to pass, and means independent of the fabric passing to the core for driving said roll comprising a driving wheel, means adapted to suspend said roll and said driving wheel in proximity to the core, means adapted to hold the driving wheel in frictional engagement with the core or partially formed tire thereon, and a gearing connecting said driving wheel and said roll and adapted to be actuated by said driving wheel to thereby rotate said roll.

11. In a tire making machine, a core, means for rotating the same, a fabric roll, a framework for supporting said fabric roll, a second frame pivotally supported by said first mentioned frame and suspended between the latter and said core, a driving roll and a feed roll operatively connected thereto mounted in said second frame, and means adapted to urge said driving roll into frictional engagement with the core or uncompleted tire thereon.

12. In a tire making machine, a core, means for rotating the same, a fabric reel, a cylindrical roll and a convex roll over which said fabric passes between said reel and said core, and means independent of the fabric passing to the core for driving said rolls.

13. In a tire making machine, a core, means for rotating the same, a cylindrical roll and a convex roll over which fabric passes, said cylindrical roll being provided with a roughened surface adapted to give a steady pull, and means independent of the fabric passing to the core for driving said rolls.

14. In a tire making machine, a core, means for rotating the same, a roll for feeding fabric to said core, and mechanism connecting the two for maintaining constant the ratio of the peripheral speed of said roll to the peripheral speed of the core or partially formed tire thereon.

15. In a tire making machine, a core, means for positively rotating the same, a feed roll, a driving wheel, means for transmitting motion from said driving wheel to said roll, a spring for holding said driving wheel in contact with said core or the partially formed tire thereon, and means for adjusting the tension of said spring.

16. In a tire making machine, a core, means for operatively rotating the same, a fabric roll, a frame to support the fabric roll, a second frame pivotally suspended from said first frame, a feed roll and a driving roll therefor mounted thereon, and means adapted to hold said driving roll in frictional engagement with said core or the partially completed tire thereon comprising a framework backed by a spring, and means adapted to adjust the tension of said spring to thereby adjust the pressure of said driving roll.

17. In a tire making machine, a core, means for positively rotating the same, a fabric roll, a frame therefor, a second frame pivotally supported by said first mentioned frame between said fabric roll and said core, a feed roll and a driving roll therefor mounted to rotate in said second frame, and means adapted to urge said driving roll into contact with said core or the uncompleted tire thereon comprising a framework connected to said second frame and having an arm projecting therefrom, a spring member adapted to hold said arm, and a lever adapted to coact with said arm to set said framework and thereby said driving wheel in a given position with respect to said core.

18. In a tire making machine, means for forming fabric into a tire, and means for shaping the fabric prior to its incorporation into the tire approximately into the shape it is to occupy in the completed tire.

19. In a tire making machine, a core, means for shaping fabric prior to its application to the core approximately into the shape it is to occupy in the completed tire, and means for applying the shaped fabric to the core.

20. In a tire making machine, a core, means for supplying fabric thereto, and means for imparting to the fabric before its application to the core a curvature extending from side to side of the fabric and of the safe general outline as that of the core.

21. In a tire making machine, a core, means for feeding fabric thereto, and means for holding the fabric out of contact with the core or partially formed tire thereon until the fabric has assumed substantially the shape it is to occupy in the tire.

22. In a tire making machine, in combination, a core, means for supplying fabric thereto, a guide shoe having a convex guiding surface of approximately the same curvature as that of said core, and means for supporting the guide shoe in such position with relation to the core that the fabric will pass from the shoe to the core without reversal of curvature.

23. In a tire making machine, in combination, a core, means for supplying fabric thereto, a guide shoe having a convex guiding surface curved longitudinally to a large radius, the longitudinal and lateral curves of said guiding surface approximating the longitudinal and lateral curves of the surface of said core, and laterally to a small radius, and means for supporting the guide shoe in such position with relation to the core that the fabric will pass from the shoe to the core without reversal of curvature.

24. In a tire-making machine, in combination, a core, means for supplying fabric thereto, a guide shoe having a convex guiding surface curved longitudinally to a large radius, said guiding surface being positioned to embrace a portion of the core adjacent the point of delivery of shaped fabric to the core, and laterally to a small radius, and means for supporting the guide shoe in such position with relation to the core that the curvature of the guiding surface of the shoe is substantially continuous with the curvature of that part of the core surface with which the fabric passing from the guiding surface to the core surface initially contacts.

25. In a tire making machine, a guide shoe having a guiding surface of substantially the same curvature as that of the tire to be formed and substantially concentric therewith.

26. In a tire making machine, a guide shoe having a convex guiding surface curved transversely to approximately the radius of the outer part of the tire section and substantially concentric therewith.

27. In a tire making machine, a core, a guide shoe having a convex guiding surface of substantially the same curvature as that of the outer part of the core, and means for supporting the shoe in proximity to the outer surface of the core, and in a position substantially concentric therewith, said shoe and core being capable of relative rotation.

28. In a tire making machine, a core, means for positively rotating the same and a guide shoe over which fabric is drawn by the rotation of the core, said guide shoe surrounding a portion of said core and acting to cup the fabric approximately to the transverse curvature it is to have in the completed tire.

29. In a tire making machine, a core, means for rotating the same, a driven roll for feeding fabric to the core, said rotating means coöperating with said driven roll to build up a tire on said core, and a non-rotatable shaping member over which the fabric passes between the said roll and said core.

30. In a tire making machine, a rotatable core, a feed roll for feeding fabric to the core, and means over which the fabric is drawn between the core and the roll for shaping the fabric approximately to the shape it is to occupy in the completed tire.

31. In a tire making machine, a forming device about which fabric is adapted to be formed, means for stretching the fabric longitudinally prior to its application to the forming device, and means for shaping the stretched fabric approximately to the shape it is to occupy in the completed tire before it is applied to the forming device.

32. In a tire making machine, a forming device adapted to have fabric formed upon it, means for stretching the fabric longitudinally prior to its application to the forming device, and means for imparting to the stretched fabric before its application to the forming device a transverse curvature extending the width of the fabric and approximating in outline the transverse curvature of the core.

33. In a tire making machine, a core, means for rotating the same, a feed roll for feeding fabric to the core, mechanism for driving said roll at a less peripheral speed than that of the core, and a shaping and guiding shoe over which the fabric passes between the said roll and the core.

34. In a tire making machine, a core, means for rotating the same, a fabric reel, a cylindrical roll, a convex roll and a guiding shoe over which the fabric passes in succession from the reel to the core, means for driving said convex roll at a less peripheral speed than that of the core, and means for driving said cylindrical roll.

35. In a tire making machine, a core, a guide shoe over which fabric is fed to said core, and means for supporting said guide shoe at a constant distance from the surface of said core or partially formed tire thereon.

36. In a tire making machine, a core, a shaping and guiding shoe for guiding the fabric to said core, and means including a roller resting upon said core, or upon the partially formed tire thereon, for supporting said shoe.

37. In a tire making machine, a rotatable core, a shaping and guiding shoe for guiding the fabric to said core, a pivoted frame supporting said shoe, and a roller resting on said core or the partially formed tire thereon supporting the free end of said frame.

38. In a tire making machine, a rotatable shaft, a plurality of adjustable radially disposed arms carried thereby, said arms having salient V-shaped extremities, and a tire ring having a V-shaped circumferential groove in its inner face, adapted to receive said extremities, whereby the tire-ring is supported on said arms.

39. In a tire making machine, a rotatable core, a fabric roll, a roll intermediate said core and said fabric roll engaging the fabric, a driving member for said roll adapted to be driven by frictional engagement with said core, and a framework having one extremity supported adjacent said driving member, its other extremity being supported by a shaping roll adapted to contact with the core or partially formed tire thereon, and a guiding member positioned on said frame intermediate its extremities and adapted to receive and guide fabric onto said core.

40. In a tire making machine, a rotatable core, a fabric roll, a roll intermediate said core and said fabric roll engaging the fabric, a driving member for said roll adapted to be driven by frictional engagement with said core, and a framework having one extremity supported adjacent said driving member, its other extremity being supported by a shaping roll adapted to contact with the core or partially formed tire thereon, and a guiding member having substantially the same curvature as the core positioned intermediate the extremities of said framework and embracing the walls of the core for a distance substantially equal to their depth.

41. In a tire making machine, in combination, a core, means for feeding fabric thereto, and a leader strip adapted to be connected at one end to said core and at the other end to the end of the strip of fabric to be formed into a tire, said strip being removable from the core prior to the formation of the tire.

42. In a tire making machine, a rotatable core, means for feeding fabric to said core at a less speed than it is taken up by the same, and an elastic leader strip adapted to be connected at one end to said core, and at the other end to the end of the strip of fabric to be formed into a tire.

43. In a tire making machine, a rotatable core, means for feeding fabric thereto comprising a roll, means for rotating said roll at a less peripheral speed than that of said core and a leader strip of flexible material adapted to be connected at one end to said core, and at the other end to the end of the strip of fabric to be formed into the tire, said leader strip being of sufficient length to reach from a point of tangency to said core to a point beyond its point of tangency with said feed roll.

JOHN R. GAMMETER.

Witnesses:
R. M. PIERSON,
WALTER K. MEANS.